(12) United States Patent
Mu et al.

(10) Patent No.: US 11,714,219 B2
(45) Date of Patent: Aug. 1, 2023

(54) INFRARED BAND PASS FILTER HAVING LAYERS WITH REFRACTION INDEX GREATER THAN 3.5

(71) Applicant: Platinum Optics Technology Inc., Taoyuan (TW)

(72) Inventors: Cheng-Tang Mu, Taoyuan (TW); Yu-Ching Su, Taoyuan (TW)

(73) Assignee: Platinum Optics Technology Inc., Taoyuan (TW)

(*) Notice: Subject to any disclaimer, the term of this patent is extended or adjusted under 35 U.S.C. 154(b) by 236 days.

(21) Appl. No.: 16/508,936

(22) Filed: Jul. 11, 2019

(65) Prior Publication Data
US 2020/0057183 A1   Feb. 20, 2020

(30) Foreign Application Priority Data
Aug. 14, 2018   (CN) .......................... 201810921532.7

(51) Int. Cl.
*G01N 21/35* (2014.01)
*G01N 29/42* (2006.01)
(Continued)

(52) U.S. Cl.
CPC ............. *G02B 5/281* (2013.01); *G01N 21/35* (2013.01); *G01N 29/42* (2013.01); *G02B 1/115* (2013.01);
(Continued)

(58) Field of Classification Search
CPC ........ G01N 21/35; G01N 21/359; G02B 1/04; G02B 1/115; G02B 5/208; G02B 5/281; G02B 5/285; G02B 5/288; G02B 13/14
See application file for complete search history.

(56) References Cited

U.S. PATENT DOCUMENTS

| 2,852,980 A | 9/1958 | Hubert |
| 2,920,002 A | 1/1960 | Max |

(Continued)

FOREIGN PATENT DOCUMENTS

| CN | 101421641 A | 4/2009 |
| CN | 201378210   | 1/2010 |

(Continued)

OTHER PUBLICATIONS

Notice of Allowance for Korean Patent Application No. 10-2019-0054163 dated Nov. 18, 2020; 2 pgs.

(Continued)

*Primary Examiner* — Ryan S Dunning
(74) *Attorney, Agent, or Firm* — Ryan Dean; Umberg Zipser LLP

(57) ABSTRACT

The present disclosure relates to an infrared band pass filter, which comprises a first multilayer film. The first multilayer film including a plurality of Si:NH layers and a low refraction index layer. The plurality of low refraction index layers are stacked with Si:NH layers alternatively; wherein the difference between the refraction index of Si:NH layer and the refraction index of the low refraction index layer is greater than 0.5. The infrared band pass filter has a pass band in a wavelength range of 800 nm and 1100 nm, and when the incident angle is changed from 0 degrees to 30 degrees, the center wavelength of the pass band is shifted less than 12 nm, and the infrared band pass filter of the present disclosure can be used to enhance the 3D image resolution when applied to a 3D imaging system.

9 Claims, 4 Drawing Sheets

(51) Int. Cl.
    G02B 1/115    (2015.01)
    G02B 5/20     (2006.01)
    G02B 5/28     (2006.01)
    G02B 13/14    (2006.01)
(52) U.S. Cl.
    CPC ............. G02B 5/208 (2013.01); G02B 5/288 (2013.01); G02B 13/14 (2013.01)

(56) References Cited

U.S. PATENT DOCUMENTS

| | | |
|---|---|---|
| 3,514,174 A | 5/1970 | Gans et al. |
| 3,528,726 A | 9/1970 | Austin |
| 3,620,626 A | 11/1971 | Daly et al. |
| 3,781,111 A | 12/1973 | Fletcher et al. |
| 3,976,875 A | 8/1976 | Engstrom et al. |
| 3,996,461 A | 12/1976 | Sulzbach et al. |
| 4,158,133 A | 6/1979 | Spaeth et al. |
| 4,835,381 A | 5/1989 | Sorensen |
| 4,846,541 A | 7/1989 | Miura et al. |
| 4,854,670 A | 8/1989 | Mellor |
| 5,183,700 A | 2/1993 | Austin |
| 5,242,740 A | 9/1993 | Rostaing et al. |
| 5,258,618 A | 11/1993 | Noble |
| 5,372,874 A | 12/1994 | Dickey et al. |
| 5,398,133 A | 3/1995 | Tsai et al. |
| 5,605,609 A | 2/1997 | Ando et al. |
| 6,104,530 A | 8/2000 | Okamura et al. |
| 6,115,180 A | 9/2000 | Hirai et al. |
| 6,249,378 B1 | 6/2001 | Shimamura et al. |
| 6,323,942 B1 | 11/2001 | Bamji |
| 6,572,975 B2 | 6/2003 | Dalakos |
| 6,809,859 B2 | 10/2004 | Erdogan et al. |
| 6,936,551 B2 | 8/2005 | Moghadam et al. |
| 7,049,004 B2 | 5/2006 | Domash et al. |
| 7,068,430 B1 | 6/2006 | Clarke et al. |
| 7,133,197 B2 | 11/2006 | Ockenfuss et al. |
| 7,194,209 B1 | 3/2007 | Robbins et al. |
| 7,247,835 B2 | 7/2007 | Chang |
| 7,340,077 B2 | 3/2008 | Gokturk et al. |
| 7,405,880 B2 | 7/2008 | Nikolov et al. |
| 7,859,754 B2 | 12/2010 | Falicoff |
| 7,901,870 B1 * | 3/2011 | Wach ....................... G02B 5/28 430/321 |
| 7,903,338 B1 | 3/2011 | Wach |
| 7,993,700 B2 | 8/2011 | Zhou et al. |
| 3,080,776 A1 | 12/2011 | Kurahashi et al. |
| 8,227,883 B2 | 7/2012 | Kasano et al. |
| 8,304,727 B2 | 11/2012 | Lee et al. |
| 8,461,533 B2 | 6/2013 | Findlay |
| 8,481,109 B2 | 7/2013 | Zambov et al. |
| 8,852,844 B2 | 10/2014 | Ogihara et al. |
| 8,861,088 B2 | 10/2014 | Ohnishi |
| 8,993,072 B2 | 3/2015 | Xiao et al. |
| 9,077,868 B2 | 7/2015 | Pilgrim |
| 9,098,931 B2 | 8/2015 | Shpunt et al. |
| 9,322,965 B2 | 4/2016 | Osawa et al. |
| 9,354,369 B2 | 5/2016 | Hendrix et al. |
| 9,550,864 B2 | 1/2017 | Bloomfield |
| 9,570,490 B2 | 2/2017 | Kakiuchi et al. |
| 9,588,269 B2 | 3/2017 | Hendrix et al. |
| 10,168,459 B2 | 1/2019 | Ockenfuss |
| 10,222,526 B2 | 3/2019 | Hendrix et al. |
| 10,455,167 B2 * | 10/2019 | Inoguchi ................. H04N 5/33 |
| 10,962,477 B2 | 3/2021 | Won et al. |
| 11,131,794 B2 | 9/2021 | Hendrix et al. |
| 2002/0080493 A1 | 6/2002 | Tsai et al. |
| 2002/0154387 A1 | 10/2002 | Mori et al. |
| 2003/0087121 A1 | 5/2003 | Domash et al. |
| 2004/0001182 A1 | 1/2004 | Dyner |
| 2007/0024779 A1 | 2/2007 | Sharp |
| 2007/0189583 A1 | 8/2007 | Shimada et al. |
| 2008/0006762 A1 | 1/2008 | Fadell et al. |
| 2008/0013178 A1 | 1/2008 | Terada |
| 2008/0105298 A1 | 5/2008 | Lu et al. |
| 2008/0223436 A1 | 9/2008 | Boer et al. |
| 2009/0002830 A1 | 1/2009 | Okamoto |
| 2009/0294634 A1 | 12/2009 | Kurahashi et al. |
| 2010/0007717 A1 | 1/2010 | Spektor et al. |
| 2010/0020078 A1 | 1/2010 | Shpunt |
| 2010/0118123 A1 | 5/2010 | Freedman et al. |
| 2010/0284088 A1 | 11/2010 | Zambov et al. |
| 2011/0232745 A1 | 9/2011 | Alves et al. |
| 2011/0301500 A1 | 12/2011 | Maguire et al. |
| 2011/0310472 A1 | 12/2011 | Hirai et al. |
| 2012/0087645 A1 | 4/2012 | Wu et al. |
| 2012/0099188 A1 | 4/2012 | Akozbek et al. |
| 2012/0145901 A1 | 6/2012 | Kakiuchi et al. |
| 2012/0182392 A1 | 7/2012 | Kearns et al. |
| 2012/0224061 A1 | 9/2012 | Pilgrim |
| 2012/0268809 A1 | 10/2012 | Guo et al. |
| 2012/0326191 A1 | 12/2012 | Fu |
| 2013/0050811 A1 | 2/2013 | Lin et al. |
| 2014/0014838 A1 | 1/2014 | Hendrix et al. |
| 2015/0346403 A1 | 12/2015 | Jidai et al. |
| 2016/0238759 A1 * | 8/2016 | Sprague ............... C23C 14/3414 |
| 2016/0266289 A1 | 9/2016 | Hendrix et al. |
| 2017/0357033 A1 * | 12/2017 | Ockenfuss .......... C23C 14/3457 |
| 2019/0352222 A1 * | 11/2019 | Zhang .................... C03C 17/36 |
| 2020/0408977 A1 * | 12/2020 | Eisenhammer ......... C23C 14/35 |

FOREIGN PATENT DOCUMENTS

| | | |
|---|---|---|
| CN | 1892676 B | 5/2010 |
| CN | 105452911 B | 6/2017 |
| CN | 107209305 A | 9/2017 |
| CN | 107710034 A | 2/2018 |
| CN | 107841712 A | 3/2018 |
| CN | 108303759 A | 7/2018 |
| EP | 1816677 A1 | 8/2007 |
| EP | 1879058 A2 | 1/2008 |
| JP | 2016164670 A | 9/2016 |
| KR | 20110086552 A | 7/2011 |
| KR | 20170106448 A | 9/2017 |
| KR | 20180008898 A | 1/2018 |
| TW | 200513812 A | 4/2005 |
| TW | 201743439 A | 12/2017 |
| WO | 2011027903 A1 | 3/2011 |
| WO | 2014088063 A1 | 6/2014 |
| WO | 2014168190 A1 | 10/2014 |

OTHER PUBLICATIONS

Office Action for Korean Patent Application No. 10-2019-0054163 dated May 26, 2020; 7 pgs.
Taiwan Patent Office, Office Action, dated Jul. 19, 2019.
China Patent Office, Office Action, dated Apr. 27, 2021.
Chinese Patent Office Notice of Allowance; Application No. 201810921532.7, dated Jul. 28, 2021, 4 pages.
Tunable and Switchable Multiple-Cavity Thin Film Filters J. Lightwave Technol. vol. 22 No. 1 (2004) L. Domash.
Xbox 360 Kinect Teardown—The Kinect is a Peripheral Containing Suite of Sensors for Microsoft's Xbox 360 that provides a "Controller-Free Gaming and Entertainment Experience." 2020 (Kyle Wiens).
Amorphous silicon and amorphous silicon nitride films prepared by a plasma-enhanced chemical vapor deposition process as optical coating materials Applied Optics vol. 32 No. 28 R.Y. Tsai (Oct. 1993).
Antireflective Coating Using Aluminum Hydroxide formed by Hydrothermal Treatment of Sputtered Aluminum Films, Ishiguro (2009).
a-Si:H/SiO2 multilayer films fabricated by radio-frequency magnetron sputtering for optical filters Applied Optics vol. 43 No. 17 H. Yoda (2004).
Characterization of hydrogenated amorphous silicon thin films prepared by magnetron sputtering J. of Non-Crystalline Solids 352 2006) 18-23 M. Hossain.
Coating design contest: antireflection coating for lenses to be used with normal and infrared photographic film Proc. SPIE 1782 Thin Films for Optical Systems pp. 552-601 (Mar. 4, 1993).

(56) References Cited

OTHER PUBLICATIONS

Defendant Platinum Optics Technology Inc.'s Invalidity Contentions from Case No. 5:20-cv-05501, Dated Jan. 15, 2021.
Deposition parameters and film properties of hydrogenated amorphous silicon prepared by high rate dc planar magnetron reactive sputtering J. Appl. Phys. 55 4232 (1984) N. Sawides.
Development and Implementation of a Hydrogenated a-Si Reactive Sputter Deposition Process Society of Vacuum Coaters K. Gibbons (2007).
Effect of hydrogen dilution of silane on optoelectronic properties in glow-discharged hydrogenated silicon films J. Appl. Phys. 58 3661 (1985) S. Shirafuji.
Effective Refractive Index as a Criterion of Performance of Interference Filters J. of the Optical Society of Am. Vol. 58 No 12 P. H. Lissberger (Dec. 1968).
Effects of the Variation of Angle of Incidence and Temperature on Infared Filter Characteristics, 1967 (Baker and Yen).
Evolution of microstructures in hydrogenated silicon films prepared by diluted-hydrogen and hydrogen-atom-treatment methods J. Appl. Phys. 73 (10) (May 15, 1993) K.C. Hsu.
Handbook of Optics I: Part 11 Chapter 42: Optical Properties of Films and Coatings J.A. Dobrowolski (1995).
How Microsoft's PrimeSense-Based Kinect Really Works, 2011 (William Wong).
How Motion Detection Works in Xbox Kinect (Wired, 2010) (Tim Carmody).
Hydrogenated Amorphous Silicon Alloy Deposition Processes, 1993.
Hydrophobic and Optical Properties of Silica Antireflective Coating Prepared via Sol-Gel Method, 2021 (Zhang).
Influence of Sputtering Conditions on H Content and Si-H Bonding IN a-Si:H Alloys, 1981 (P.M. Martin and W.T. Pawlewicz).
Kinect Manual.
Kinect Unleashed: Getting Control over High Resolution Depth Maps, 2013 (Manuel Martinez and Rainer Stiefelhagen).
Kinetics of decomposition of amorphous hydrogenated silicon films J. Appl. Phys. 50 5238 (1979) J. A. McMillan.
Microsoft Kinect: Features and Implementation, 2013 (Francesco Castaldo).
Microstructure and properties of rf-sputtered amorphous hydrogenated silicon films JAppl. Phys. 52 5329 (1981) R. C. Ross et al.
Optical and structural properties of hydrogenated silicon films prepared by rf-magnetron sputtering at low growth temperatures: Study as a function of argon gas dilution J on Non-Crystalline Solids 358 (2012) 854-859 Y. Bouizem.
Optical Filter on the Window on 0-25 Degree Incidence Angle 980nm Semiconductor Detector 2010 Academic Symposium on Optoelectronics and Microelectronics Technology and 10th Chinese-Russian Symposium on Laser Physics and Laser Technology Optoelectronics Technology (ASOT) Harbin 2010 L. Peng (2010).
Optical properties of a-Si and a-Si:H prepared by DC magnetron techniques J. Phys C: Solid State Phys. 16 (1983) 4933-4944 (1983) D. R. McKenzie.
Optical properties of hydrogenated amorphous silicon J. Appl. Phys. 59 611 (1986) F. Demichelis et al.
Optical Properties of Sputtered Si: H, 1982 (P.M. Martin W.T. Pawlewicz I.B. Mann).
Optical Thin Films: User Handbook, 1996.
How You Become the Controller, 2010 (Ron Forbes).
Patent Trial and Appeal Board, IPR2021-00424 IPR Petition, Dated Jan. 19, 2021.
Patent Trial and Appeal Board, IPR2021-00432 IPR Petition, Dated Feb. 4, 2021.
Patent Trial and Appeal Board, IPR2021-00631 IPR Petition, Dated Mar. 29, 2021.
Patent Trial and Appeal Board, IPR2022-01489 IPR Petition, Dated Sep. 6, 2022.
Plasma Deposition of Optical Films and Coatings: A Review, 2000 (L. Martinu and D. Poitras).
Practical Design of Optical Thin Films 2nd Ed. R.R. Willey.
PrimeSense Reference Design, 2010.
Process investigation of a-Si:H thin films prepared by DC magnetron sputtering Proc. SPIE 6825 Lasers in Material Processing and Manufacturing III 682514 (Jan. 2008) L. Chunling.
Recent Developments in Reactively Sputtered Optical Thin Films, 1981 (W.T. Pawlewicz).
Reduced Angle-Shift Infrared Bandpass Filter Coatings Proc, of SPIE vol. 6545 Window and Dome Technologies and Materials X 654501 B.M. Lairson (May 2007).
Resolving Power of Multilayer Filters in Nonparallel Light, 1964 (C.R. Pidgeon and S.D. Smith).
Rugate filters fabricated by a radio frequency magnetron sputtering system by use of an optical in situ monitoring technique Applied Optics vol. 45 No. 1 H. Yoda (Jan. 2006).
Silicon Nitride (Si3N4) (Noncrystalline) Handbook of Optical Constants of Solids pp. 771-774 (1985) H. R. Philipp.
Silicon Nitride ARC Thin Films by New Plasma Enhanced Chemical Vapor Deposition Source Technology, 2008 (M. George H. Chandra P. Morse J. Morris and J. Madocks.
Sputtered hydrogenated amorphous silicon thin films for distributed Bragg reflectors and long wavelength vertical cavity surface emitting lasers and applications Thin Solid Films 519 (2011) 6178-6182 A. Shuaib.
Sputtered Si:H alloys for edge filters: application to thermophotovoltaics Applied Optics vol. 41 No. 31 (Nov. 1, 2002) P. M. Martin.
Stable ultranarrow bandpass filters Proc. SPIE 2262 Optical Thing Films IV: New Developments (Sept. 7 1994) M. Scobey.
Structure and optical properties of the hydrogen diluted a-Si:H thin films prepared by PECVD with different composition temperatures The Eighth International Conference on Advanced Semiconductor Devices and Microsystems Smolenice 2010 pp. 329-332 films prepared by PECVD with different composition temperatures films prepared by PECVD with different composition temperatures M. Netrvalova (2010).
The Reflective Properties of Broadband Optical Multilayers Acta Physica Sinica vol. 6 No. 5 (May 1997) Z. Dao-Zhong.
Thin-Film Optical Filters Second Ed. (McGraw-Hill 1989) H. A. Macleod.

\* cited by examiner

INFRARED BAND PASS FILTER HAVING LAYERS WITH REFRACTION INDEX GREATER THAN 3.5

CROSS REFERENCE TO RELATED APPLICATION

This application claims the priority benefit of Chinese Patent Application Serial Number 201810921532.7, filed on Aug. 14, 2018, the full disclosure of which is incorporated herein by reference.

BACKGROUND

Technical Field

The present disclosure relates to the technical field of optical filtering, and more particularly to an infrared band pass filter.

Related Art

The existing infrared band pass filter comprises an optical substrate having a multilayer film formed on one surface of the optical substrate, and a multilayer anti-refraction layer formed on the other surface thereof. The multilayer film is formed by alternately depositing a plurality of high refractive index layers and a plurality of low refractive index layers. The material of the high refraction index layer is selected from the group consisting of $Ti_3O_5$, $Ta_2O_5$, $ZrO_2$, $Nb_2O_5$ and $TiO_2$ and the material of the low refraction index layer is selected from one of the $MgF_2$ and $SiO_2$.

The infrared band pass filter has a pass band in the wavelength range between 800 nm and 1100 nm. When the incident angle is changed from 0 degrees to 30 degrees, the center wavelength of the pass band is shifted between 31 nm and 34 nm. The center wavelength of the pass band is greatly shifted due to the angle changed, and when the infrared band pass filter is applied to the three-dimensional (3D) imaging system, the problem of unrecognizable or identification failure occurs when the light is received at a large angle.

SUMMARY

The present disclosure provides an infrared band pass filter, comprising: a first multilayer film, wherein the first multilayer film comprises: a plurality of Si:NH layers, wherein the refraction index of each Si:NH layer is larger than 3.5 in the wavelength range between about 800 nm and 1100 nm, and the extinction coefficient of the each Si:NH layer is smaller than 0.0002; and plurality of low refraction index layers a plurality of low refraction index layers, stacking with the plurality of Si:NH layers alternatively, wherein the refraction index of each low refraction index layer is smaller than 3 in the wavelength range between 800 nm and 1100 nm; wherein an difference value between the refraction index of the each Si:NH layer and the low refraction index layer is larger than 0.5.

According to one embodiment of the present disclosure, the infrared band pass filter further comprises a substrate; the first multilayer film is formed on one surface of the substrate.

According to one embodiment of the present disclosure, the infrared band pass filter further comprises a second multilayer film which is formed on the other surface of the substrate, being opposite to the first multilayer film.

According to one embodiment of the present disclosure, the second multilayer film comprises: a plurality of Si:NH layers, wherein the refraction index of each Si:NH layer is larger than 3.5 in the wavelength range between about 800 nm and 1100 nm, and the extinction coefficient of the each Si:NH layer is smaller than 0.0002; and plurality of low refraction index layers a plurality of low refraction index layers, stacking with the plurality of Si:NH layers alternatively, wherein the refraction index of each low refraction index layer is smaller than 3 in the wavelength range between 800 nm and 1100 nm; wherein an difference value between the refraction index of the each Si:NH layer and the low refraction index layer is larger than 0.5.

According to one embodiment of the present disclosure, the infrared band pass filter has a pass band partially overlapping with the wavelength range between 800 nm and 1100 nm, and the center wavelength of pass band is within the wavelength range between 800 nm and 1100 nm, and having a blocking level greater than OD5 in the wavelength range between 400 nm and 1100 nm.

According to one embodiment of the present disclosure, the infrared band pass filter has a pass band partially overlapping with the wavelength range between 800 nm and 1100 nm, and the center wavelength of the pass band is in the wavelength range between 800 nm and 1100 nm.

According to one embodiment of the present disclosure, when the incident angle is changed from 0 degrees to 30 degrees, and the center wavelength of the pass band is shifted less than 12 nm.

According to one embodiment of the present disclosure, the sum of the number of layers of the Si:NH layer and the number of layers of the low refraction index layer is less than 39 layers.

According to one embodiment of the present disclosure, the total thickness of the plurality of Si:NH layers and the plurality of low refraction index layers is less than 4.5 um.

According to one embodiment of the present disclosure, the hardness of infrared band pass filter is greater than Mohs hardness 7.

According to one embodiment of the present disclosure, the material of the low refraction index layer is selected from the group consisting of $SiO_2$, $Al_2O_3$, $TiO_2$, $Nb_2O_5$, $Ta_2O_5$, SiOH and SiNOH.

According to one embodiment of the present disclosure, the material of the low refraction index layer is SiO2, the refraction index of the low refraction index layer is between 1.4 and 1.5 in a wavelength range between 800 nm and 1100 nm.

According to the embodiment of the present disclosure, when the incident angle is changed from 0 degrees to 30 degrees, the center wavelength of the pass band is shifted less than 11.8 nm.

According to one embodiment of the present disclosure, the material of the low refraction index layer is SiNOH, the refraction index of the low refraction index layer is between 1.5 and 2 in a wavelength range between 800 nm and 1100 nm.

According to one embodiment of the present disclosure, when the incident angle is changed from 0 degrees to 30 degrees, the center wavelength of the pass band is shifted less than 11.1 nm.

According to one embodiment of the present disclosure, the hardness of infrared band pass filter is greater than Mohs hardness 9.

According to one embodiment of the present disclosure, the extinction coefficient of the Si:NH layer is less than 0.00012 in the wavelength range between 800 nm and 1100 nm.

According to one embodiment of the present disclosure, the transmissivity of pass band is greater than 90% in the wavelength between 800 nm and 1100 nm.

Compared with the prior art, the present disclosure can obtain the following technical effects:

The present disclosure provides an infrared band pass filter. The infrared band pass filter of the present disclosure is formed by alternatively stacking a Si:NH layer and a low refraction index layer, which has a pass band in a wavelength range between 800 nm and 1100 nm. When the incident angle is changed from 0 degrees to 30 degrees, the center wavelength of the pass band is shifted less than 12 nm, and the infrared band pass filter of the present disclosure can applied to the 3D imaging system to improve the 3D image analysis capability.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

Figure 1:
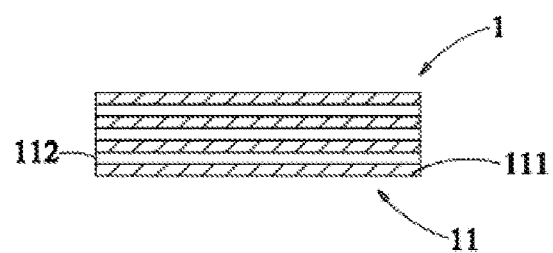
FIG. 1 shows the schematic diagram of an infrared band pass filter according to a first embodiment of present disclosure.

The present disclosure will now be described more fully hereinafter with reference to the accompanying drawings, in which exemplary embodiments of the disclosure are shown. This present disclosure may, however, be embodied in many different founts and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect. The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

In the following embodiment, the same reference numerals is used to refer to the same or similar elements throughout the disclosure.

FIG. 1 shows the schematic diagram of an infrared band pass filter according to a first embodiment of present disclosure. As shown in FIG. 1, the embodiment provides an infrared band pass filter 1 adapted for a 3D imaging system. The infrared band pass filter 1 comprises a first multilayer film 11. The first multilayer film 11 comprises a plurality of Si:NH layers 111 and a plurality of low refraction index layers 112, and the plurality of low refraction index layers 112 are stacking with the plurality of Si:NH layers alternatively. The refraction index of each Si:NH layer 111 is larger than 3.5 in the wavelength range between 800 nm and 1100 nm, and the extinction coefficient of the each Si:NH layer is smaller than 0.0002. In another embodiment, the extinction coefficient of the each Si:NH layer less than 0.00012. The refraction index of each low refraction index layer 112 is smaller than 3 in the wavelength range between 800 nm and 1100 nm; wherein an difference value between the refraction index of the each Si:NH layer 111 and the low refraction index layer 112 is larger than 0.5.

In the embodiment, the sum of the number of Si:NH layers 111 and the number of low refraction index layer 112 is smaller than 39 layers. The total thickness of the plurality of Si:NH layers 111 and the plurality of low refraction index layers 112 is smaller than 4.5 um. In the embodiment, the infrared band pass filter 1 has some band pass overlapping the wavelength range between 800 nm and 1100 nm. The center wavelength of the band pass is located in the wavelength range between 800 nm and 1100 nm.

While the incidence angle is changed from 0 degrees to 30 degrees, the center wavelength of the pass band is shifted less than 12 nm. Transmissivity of the band pass is larger 90% in the wavelength range between 800 nm and 1100 nm. In the embodiment, the hardness of the infrared band pass filter is larger than Mohs' hardness 7. In the embodiment, the center wavelength of the big angle of the infrared band pass filter 1 being smaller can solve the 3D imaging analyze problem effectively, while the thickness of the infrared band pass filter 1 of the present embodiment is slimmer than the infrared band pass filter of the prior technology so as to decrease the warping phenomenon of the infrared band pass filter 1.

In the embodiment, manufacture method of the infrared band pass filter 1 is to form the Si:NH layer 111 and the low refraction index layer 112 by the sputter deposition. The process of the sputter deposition is that the mid frequency sputter power source output 50 KHz voltage through the inside electrical network, respectively applied on a pair of silicon target on the sputtering machine. Argon is inputted into the silicon target via the air duct so as to generate light and discharge and generate the steady plasma.

Due to the reaction chamber of the sputtering machine has the quadrature field being vertical to the electrical filed, the movement direction of the electron is changed and limited in the certain space so as to increase the collision probability with the argon and ionization effect of electron.

The argon ion elected from ionization effect crash the silicon target quickly in the electrical field, and the mass silicon atom is sputtered out, while inductively coupled plasma (ICP) is mixed with ammonia to generate the Si:NH layer 111 which has the refraction index larger than 3.5 in the wavelength range between 800 nm and 1100 nm. The low refraction index layer 112 is selected from the group consisting of $SiO_2$, SiOH or SiNOH, and the ICP is mixed with oxygen/ammonia to generate the low refraction index layer which the refraction index is smaller than 3 in the wavelength range between 800 nm and 1000 nm. If the low refraction index layer 112 is $Al_2O_3$, $TiO_2$, $Nb_2O_5$ or $Ta_2O_5$, the silicon target of the sputtering machine is replaced with an aluminum target, a titanium target, a tantalum target or a tantalum target, and formed by the above method.

TABLE 1

| Material | TG4 gas Argon | ICP gas Argon | oxygen | Ammonia | At 940 nm n (Opt) | At 940 nm k (Opt) |
|---|---|---|---|---|---|---|
| SiNOH | 60 | 500 | 5 | 30 | 3.42022 | 8.35E−05 |
| SiNOH | 60 | 500 | 10 | 30 | 3.267666 | 6.24E−05 |
| SiNOH | 60 | 500 | 30 | 30 | 2.781278 | 3.23E−05 |
| SiNOH | 60 | 500 | 70 | 30 | 2.176382 | 2.27E−04 |
| SiNOH | 60 | 500 | 76 | 30 | 2.125067 | 2.60E−04 |
| SiNOH | 60 | 500 | 80 | 30 | 2.037629 | 1.85E−04 |
| SiNOH | 60 | 500 | 88 | 30 | 1.986488 | 1.94E−04 |
| SiNOH | 60 | 500 | 95 | 30 | 1.908388 | 1.42E−04 |
| SiNOH | 60 | 500 | 104 | 30 | 1.846262 | 1.69E−04 |
| SiNOH | 60 | 500 | 125 | 30 | 1.576734 | 1.26E−05 |

As shown in Table 1, the refraction index of the low refraction layer 112 of the embodiment will changed along with the change of the oxygen flow via the spurting process in the wavelength 940 nm. When the oxygen flow is becoming bigger, then the refraction index of the low refraction index layer 112 in the wavelength 940 nm is becoming lower. When the low refraction index layer 112 is SiNOH, the refraction index of the low refraction index layer 112 is between 1.5 and 2 in the wavelength range between 800 nm and 1100 nm. When the low refraction index layer 112 is $SiO_2$, the refraction index of the low refraction index layer 112 is between 1.4 and 1.5 in the wavelength range between 800 nm and 1100 nm.

Figure 2:
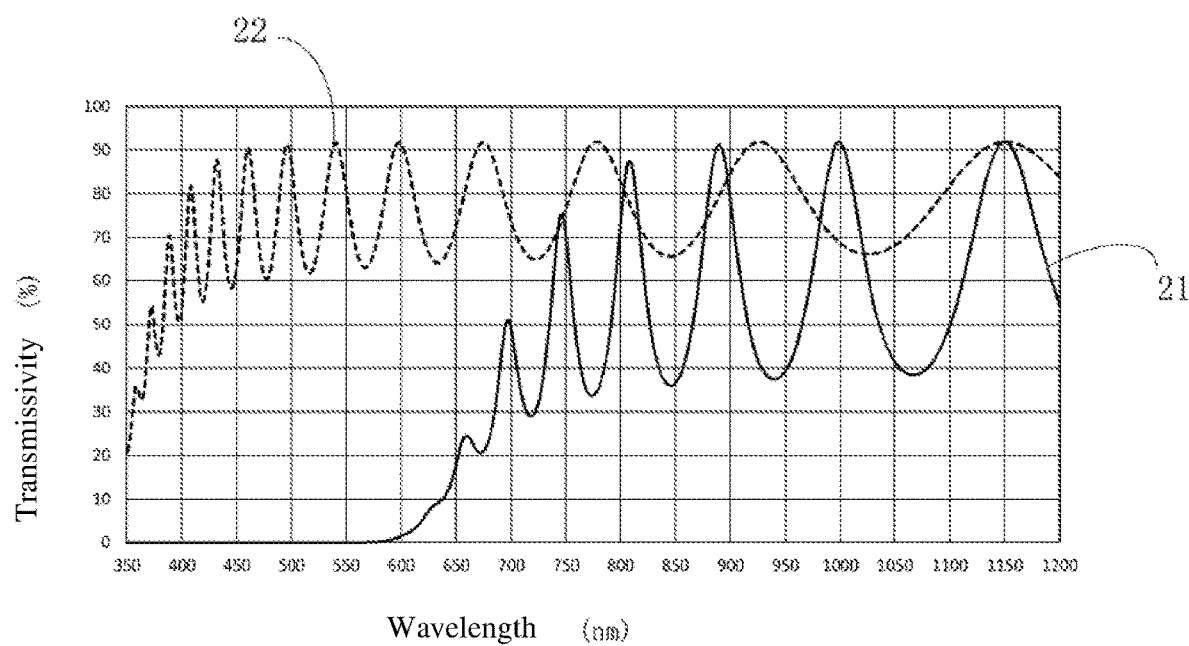
FIG. 2 shows a curve graph of the transmission spectrum of the Si:NH layer according to the first embodiment of the present disclosure.

FIG. 2 shows a curve graph of the transmission spectrum of the Si:NH layer according to the first embodiment of the present disclosure. As shown in FIG. 2, the curve 21 is the transmission spectrum of the Si:NH layer and the curve 22 is the transmission spectrum of the $Ti_3O_5$ layer. The absorption effect of the Si:NH layer 111 is better than the $Ti_3O_5$ layer used by the infrared band pass filter in the wavelength range between 350 nm and 700 nm. The infrared band pass filter 1 having Si:NH layer is applied in the 3D image system so as to increase the image analyze function of the 3D image system.

The material of the low refraction index layer 112 is selected from the group consisting of $SiO_2$, $Al_2O_3$, $TiO_2$, $Nb_2O_5$, $Ta_2O_5$, SiOH and SiNOH. The material of the low refraction index layer 112 is $SiO_2$, the refraction index of the low refraction index layer 112 is between 1.4 and 1.5 in the wavelength range between 800 nm and 1100 nm. The sum of the number of Si:NH layers 111 and the number of low refraction index layer 112 is 39 layers. The sum of thickness of the plurality of Si:NH layers 111 and the plurality of low refraction index layers 112 is 4.4 um. Table 2 shows the thickness list of each Si:NH layer 111 and each low refraction index layer 112.

TABLE 2

| Number of layers | material | thickness (nm) |
|---|---|---|
| 1 | $SiO_2$ | 82.19 |
| 2 | Si:NH | 253.51 |
| 3 | $SiO_2$ | 118.19 |
| 4 | Si:NH | 41.54 |
| 5 | $SiO_2$ | 306.22 |
| 6 | Si:NH | 92.21 |
| 7 | $SiO_2$ | 78.43 |
| 8 | Si:NH | 69.85 |
| 9 | $SiO_2$ | 70.53 |
| 10 | Si:NH | 57.16 |
| 11 | $SiO_2$ | 280.38 |
| 12 | Si:NH | 233.19 |
| 13 | $SiO_2$ | 103.92 |
| 14 | Si:NH | 21.84 |
| 15 | $SiO_2$ | 124.75 |
| 16 | Si:NH | 99.93 |
| 17 | $SiO_2$ | 99.75 |
| 18 | Si:NH | 41.78 |
| 19 | $SiO_2$ | 295.9 |
| 20 | Si:NH | 61.93 |
| 21 | $SiO_2$ | 108.78 |
| 22 | Si:NH | 31.22 |
| 23 | $SiO_2$ | 106.84 |
| 24 | Si:NH | 82.33 |
| 25 | $SiO_2$ | 128.68 |
| 26 | Si:NH | 132.25 |
| 27 | $SiO_2$ | 121.07 |
| 28 | Si:NH | 80.92 |
| 29 | $SiO_2$ | 300.84 |
| 30 | Si:NH | 94.95 |
| 31 | $SiO_2$ | 102.9 |
| 32 | Si:NH | 49.42 |
| 33 | $SiO_2$ | 113.78 |
| 34 | Si:NH | 15.21 |
| 35 | $SiO_2$ | 288.75 |
| 36 | Si:NH | 4.87 |
| 37 | $SiO_2$ | 89.27 |
| 38 | Si:NH | 17.57 |
| 39 | $SiO_2$ | 15.54 |

Figure 3:
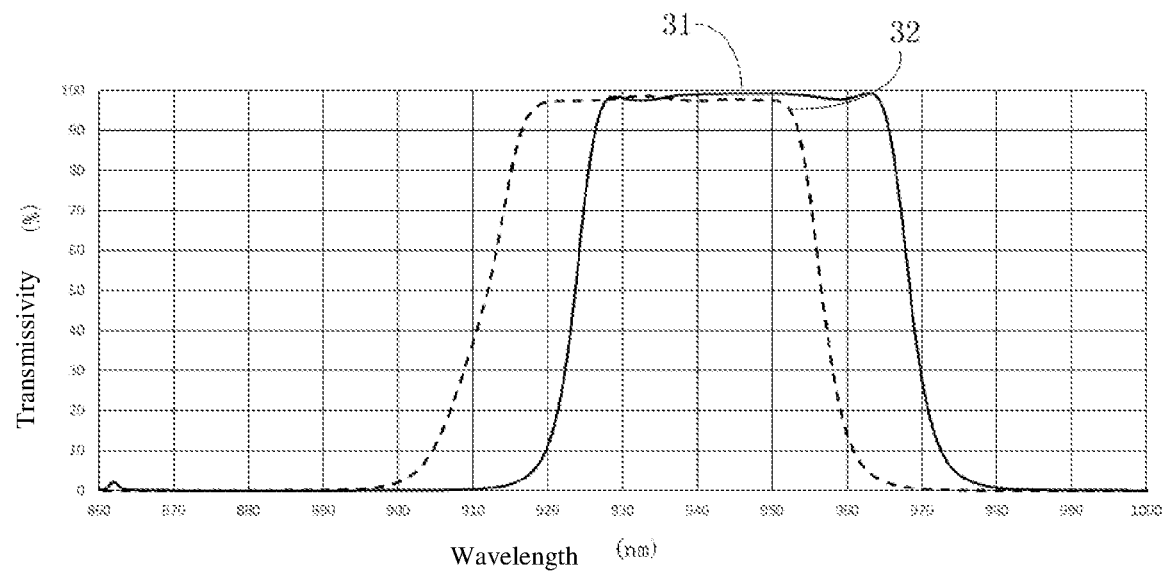
FIG. 3 shows curve graph of the transmission spectrum of incident angle from 0 degrees to 30 degrees of the infrared band pass filter.

FIG. 3 shows curve graph of the transmission spectrum of incident angle from 0 degrees to 30 degrees of the infrared band pass filter. As shown in FIG. 3, it shows the transmission spectrum curve 31 in the incident angle of 0 degrees and the transmission spectrum curve 32 in the incident angle of 30 degrees. The center wavelength of the band pass is 946 nm in the incident angle of 0 degrees in the embodiment. The center wavelength of the band pass is 934.2 nm in the incident angle of 30 degrees in the embodiment. Therefore, when the incident angle of the infrared band pass filter is changed from 0 degrees to 30 degrees, the offset amplitude of the center wavelength of the band pass is smaller than 11.8 nm. The transmissivity of the band pass is larger than 90% in the wavelength range between 800 nm and 1100 nm.

Figure 4:
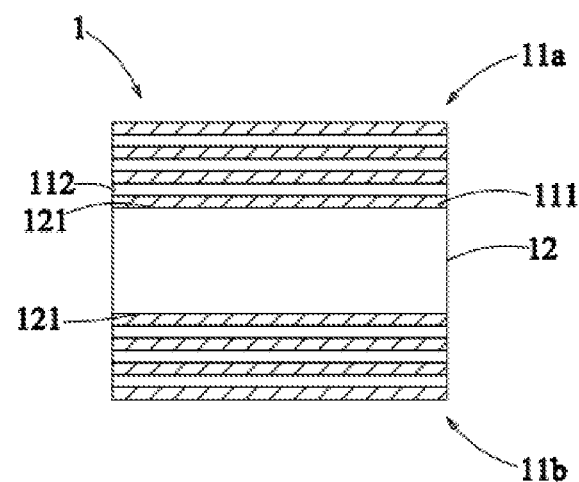
FIG. 4 shows the infrared band pass filter according to a second embodiment.

FIG. 4 shows the infrared band pass filter according to a second embodiment. As shown in FIG. 4, the infrared band pass filter 1 comprises a first multilayer film 11a, a second multilayer film 11b and an optical substrate 12. The first multilayer film 11a and the second multilayer film 11b are respectively arranged the two opposite surfaces 121 of the optical substrate 12. Specifically, the first multilayer film 11a and the second multilayer film 11b respectively has a structure of the plurality of Si:NH layers 111 alternatively stacking with the plurality of low refraction index layers 112. The manufacture methods of the Si:NH layer 111 and the low refraction index layer 112 are described above. In the embodiment, the thickness of the infrared band pass filter is slimmer than the infrared band pass filter of the prior technology, and while the infrared band pass filter 1 of the embodiment has two multilayer films, the two multilayer films will be maintained balance via film stress so as to decrease the warp phoneme happen of the infrared band pass filter.

In the infrared band pass filter 1 of the embodiment, the material of the low refraction index layer 112 of the first multilayer film 11a is SiNOH. The sum of the number of the Si:NH layer 111 and the number of the low refraction index layer 112 is 39 layers. The total thickness of the plurality of Si:NH layer 111 and the plurality of low refraction index layer 112 is 4.3 um. Table 3 shows the thickness list of the each Si:NH layer 111 and each low refraction index layer 112.

Figure 5:
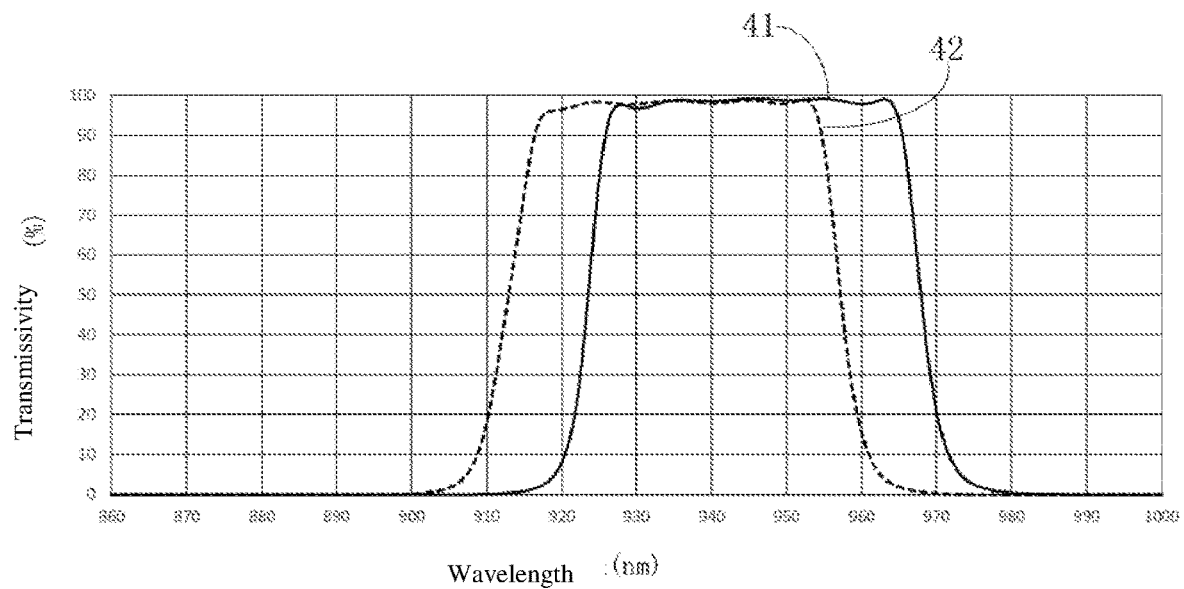
FIG. 5 shows the curve graph of the transmission spectrum of incident angle from 0 degrees to 30 degrees of the first multilayer film according to the second embodiment.

Please refer to FIG. 5, which shows the curve graph of the transmission spectrum of incident angle from 0 degrees to 30 degrees of the first multilayer film according to the second embodiment of the present disclosure; as shown in FIG. 5, which shows the transmission spectrum curve 41 at the incident angle 0 degrees and the transmission spectrum curve 42 at the incident angle 30 degrees. In the present embodiment, the center wavelength of band pass is in 939.9 nm at an incident angle of 0 degrees and the center wavelength is in 932.8 nm at an incident angle of 30 degrees. Therefore, when the infrared band pass filter of the present embodiment is changed from 0 degrees to 30 degrees, the center wavelength of the pass band is shifted less than 11.1 nm. The transmission of the pass band in the wavelength range between 800 nm and 1100 nm is more than 90%.

However, the material of the low refraction index layer 112 of the second multilayer film 11b of the present embodiment also uses SiNOH, and the total number of layers of the Si:NH layer 111 and the low refraction index layer 112 is 32 layers. The total thickness of the plurality of Si:NH layers 111 and a plurality of low refraction index layers 112 of the second multilayer film 11b is 2.7 um. The Table 3 below lists the thicknesses of each Si:NH layer 111 and the low refraction index layer 112.

TABLE 3

| Number of layers | Material | Thickness (nm) |
|---|---|---|
| 1 | SiNOH | 297 |
| 2 | Si:NH | 15.1 |
| 3 | SiNOH | 38.88 |
| 4 | Si:NH | 115.6 |
| 5 | SiNOH | 211.44 |
| 6 | Si:NH | 280.91 |
| 7 | SiNOH | 62.06 |
| 8 | Si:NH | 79.67 |
| 9 | SiNOH | 50.49 |
| 10 | Si:NH | 70.88 |
| 11 | SiNOH | 81.85 |
| 12 | Si:NH | 306.07 |
| 13 | SiNOH | 19.97 |
| 14 | Si:NH | 104 |
| 15 | SiNOH | 103.41 |
| 16 | Si:NH | 124.59 |
| 17 | SiNOH | 38.43 |
| 18 | Si:NH | 99.3 |
| 19 | SiNOH | 55.11 |
| 20 | Si:NH | 295.27 |
| 21 | SiNOH | 28.61 |
| 22 | Si:NH | 108.38 |
| 23 | SiNOH | 74.2 |
| 24 | Si:NH | 105.09 |
| 25 | SiNOH | 114.44 |
| 26 | Si:NH | 127.7 |
| 27 | SiNOH | 69.68 |
| 28 | Si:NH | 121.36 |
| 29 | SiNOH | 6.85 |
| 30 | Si:NH | 288.78 |
| 31 | SiNOH | 44.21 |
| 32 | Si:NH | 102.59 |
| 33 | SiNOH | 14.23 |
| 34 | Si:NH | 112.35 |
| 35 | SiNOH | 83.11 |
| 36 | Si:NH | 299.68 |
| 37 | SiNOH | 14.19 |
| 38 | Si:NH | 89.14 |
| 39 | SiNOH | 80.45 |

TABLE 3

| Number of layers | Material | Thickness (nm) |
|---|---|---|
| 1 | SINOH | 20.84 |
| 2 | SINH | 85.77 |
| 3 | SINOH | 121.13 |
| 4 | SINH | 72.85 |
| 5 | SINOH | 128.99 |
| 6 | SINH | 138 |
| 7 | SINOH | 108.69 |
| 8 | SINH | 49.76 |
| 9 | SINOH | 150.76 |
| 10 | SINH | 110.88 |
| 11 | SINOH | 47.85 |
| 12 | SINH | 121.71 |
| 13 | SINOH | 145.74 |
| 14 | SINH | 127.98 |
| 15 | SINOH | 63.26 |
| 16 | SINH | 122.03 |
| 17 | SINOH | 31.33 |
| 18 | SINH | 91.1 |
| 19 | SINOH | 46.32 |
| 20 | SINH | 101.34 |
| 21 | SINOH | 53.27 |
| 22 | SINH | 99.56 |
| 23 | SINOH | 57.74 |
| 24 | SINH | 71.18 |
| 25 | SINOH | 45.12 |
| 26 | SINH | 96.14 |
| 27 | SINOH | 52.1 |
| 28 | SINH | 91.74 |
| 29 | SINOH | 56.67 |
| 30 | SINH | 73.42 |

TABLE 3-continued

| Number of layers | Material | Thickness (nm) |
|---|---|---|
| 31 | SINOH | 19.03 |
| 32 | SINH | 72.95 |

Figure 6:
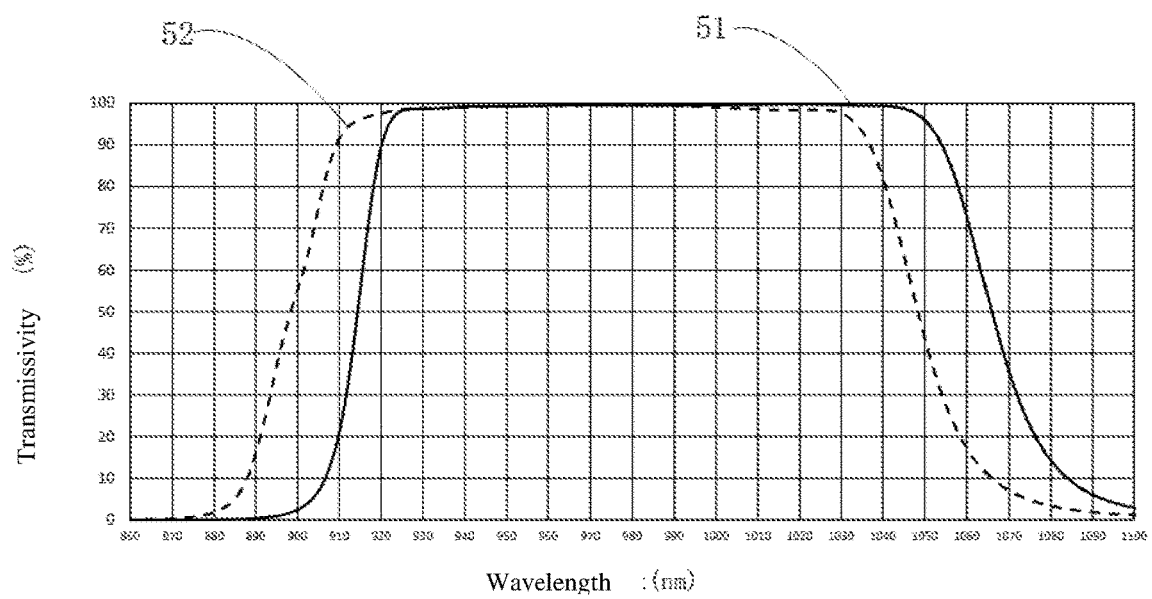
FIG. 6 shows the curve graph of the transmission spectrum of incident angle from 0 degrees to 30 degrees of the second multilayer film according to the second embodiment.
Figure 7:
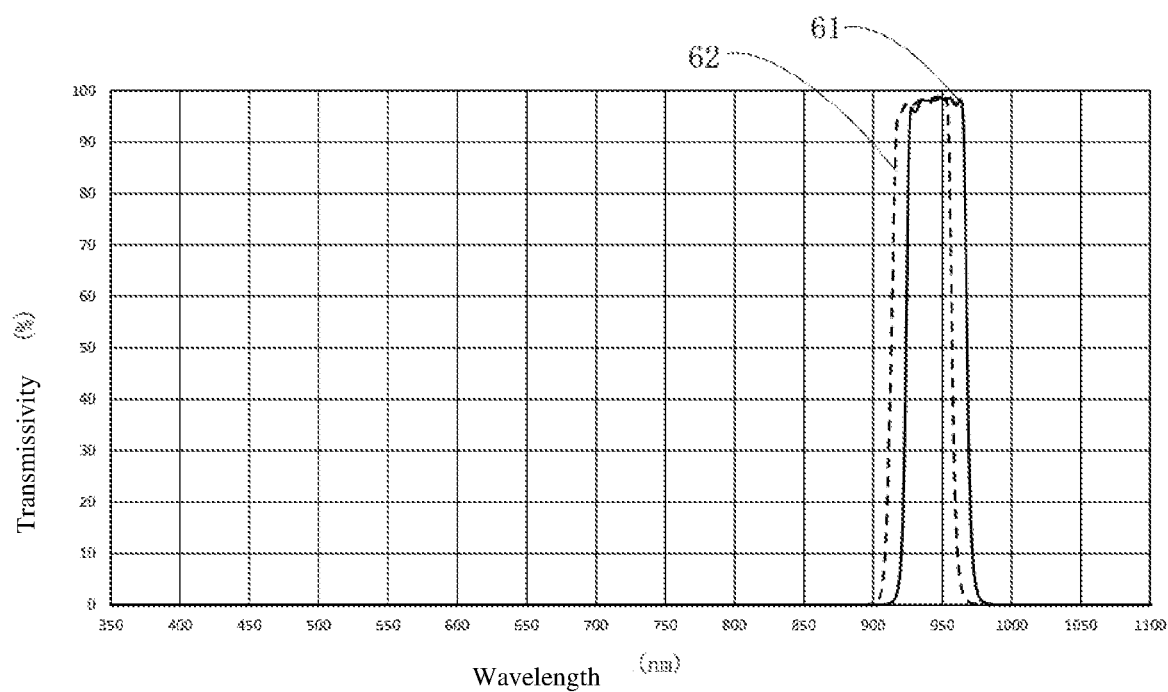
FIG. 7 shows the curve graph of the transmission spectrum of incident angle from 0 degrees to 30 degrees of the infrared band pass filter according to the second embodiment.

Referring to FIG. 6 and FIG. 7 again, it shows the curve graph of the transmission spectrum of the second multilayer film of the second embodiment of the present disclosure at an incident angle of 0 degrees and 30 degrees, and the curve graph of the transmission spectrum of the infrared band pass filter of the second embodiment of the present disclosure at an incident angle of 0 degrees and 30 degrees. As shown in FIG. 6, the transmission spectrum curve 51 at the incident angle 0 degrees and the transmission spectrum curve 52 at the incidence angle 30 degrees. The second multilayer film 11b of the present embodiment is used to increases the transmissivity of the infrared band pass filter. As can be seen from FIG. 6, the transmissivity of the pass band of the infrared band pass filter in the wavelength range between 800 nm and 1100 nm is greater than 90%, meanwhile, the outside of the pass band of the infrared band pass filter has a blocking level which is larger than OD5 in the wavelength range between 400 nm and 1100 nm. FIG. 7 shows the transmission spectrum curve 61 at an incident angle 0 degrees and the transmission spectrum curve 62 at an incident angle 30 degrees. The infrared band pass filter of the present embodiment, at an incident angle 0 degrees, has the center wavelength of the pass band being at 943.9 nm. The infrared band pass filter of this embodiment, at an incident angle 30 degrees, the center wavelength of pass band being at 932.8 nm. Therefore, when the infrared band pass filter of the present embodiment is changed from 0 degrees to 30 degrees, the shift wavelength of the center wavelength of the pass band is less than 11.1 nm.

The Mohs hardness of the infrared band pass filter of the embodiment can achieve to 9 and 9.5. The Vickers hardness is about 2200, and the micro-hardness is 32630 MPa, thus demonstrating that the infrared band pass filter of the embodiment has good chemical resistance, and having a good chemical corrosion resistance under inorganic acid, less than 30% caustic soda solution or organic acid, also being a high performance electrical insulation material. The material of the low refraction index layer 112 of the first multilayer film 11a and the second multilayer film 11b of the present embodiment can also be made of other materials such as $SiO_2$, $Al_2O_3$, $TiO_2$, $Nb_2O_5$, $Ta_2O_5$ or SiOH. The stacked of the Si:NH layer 111 and the low refraction index layer 112 of the first multilayer film 11a and the stacked of the Si:NH layer 111 and the low refraction index layer 112 of the second multilayer film 11b of the present embodiment are mutually change.

In summary, in one or more embodiments of the present disclosure, the present disclosure provides an infrared band pass filter, which having at least one multilayer film. The multilayer film is formed by the Si:NH layer and the low refraction index layer alternatively stacked, which having a pass band in a wavelength range between 800 nm and 1100 nm. When the incident angle is changed from 0 degrees to 30 degrees, the center wavelength of the pass band is shifted by less than 12 nm. The shift of the large-angle center wavelength of the infrared band pass filter of the present disclosure is small, and the infrared band pass filter of the present disclosure can improve the three-dimensional image resolution capability when applied to a three-dimensional imaging system.

It is to be understood that the term "comprises", "comprising", or any other variants thereof, is intended to encompass a non-exclusive inclusion, such that a process, method, article, or device of a series of elements not only includes those elements but also includes other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. An infrared band pass filter, comprising:
   a first multilayer film, wherein the multilayer film comprises:
      a plurality of Si:NH layers, wherein a refraction index of each Si:NH layer is greater than 3.5 in a wavelength range between about 800 nm and 1100 nm, and an extinction coefficient of each Si:NH layer is less than 0.0002; and
      a plurality of low refraction index layers, stacking with the plurality of Si:NH layers alternatively, wherein a refraction index of each low refraction index layer is less than 3 in the wavelength range between 800 nm and 1100 nm, wherein a material of the low refraction index layers of the first multilayer film is selected from SiOH and SiNOH;
      wherein a difference value between the refraction index of the each Si:NH layer and the low refraction index layer is greater than 0.5;
   a substrate, wherein the substrate is mounted in the first multilayer film; and
   a second multilayer film, formed on the other surface of the substrate, opposite to the first multilayer film, and wherein the second multilayer film comprises:
      a plurality of Si:NH layers, wherein a refraction index of each Si:NH layer is greater than 3.5 in the wavelength range between about 800 nm and 1100 nm, and an extinction coefficient of the each Si:NH layer is less than 0.0002; and
      a plurality of low refraction index layers, stacking with the plurality of Si:NH layers alternatively, wherein a refraction index of each low refraction index layer is less than 3 in the wavelength range between 800 nm and 1100 nm, wherein a material of the low refraction index layers of the second multilayer film is selected from SiOH and SiNOH;
      wherein a difference value between the refraction index of the each Si:NH layer and the low refraction index layer is greater than 0.5;
   wherein the substrate directly contacts the Si:NH layer of the first multilayer film and the Si:NH layer of the second multilayer film;
   wherein the infrared band pass filter has a pass band partially overlapping with the wavelength range between 800 nm and 1100 nm, a center wavelength of the pass band is within the wavelength range between 800 nm and 1100 nm, and the pass band has a blocking level greater than OD5 in the wavelength range between 400 nm and 1100 nm;

wherein when an incident angle is changed from 0 degrees to 30 degrees, the center wavelength of the pass band is shifted less than 12 nm.

2. The infrared band pass filter of claim 1, wherein the sum of the number of layers of the Si:NH layer and the number of layers of the low refraction index layer is less than 39 layers.

3. The infrared band pass filter of claim 1, wherein a total thickness of the plurality of Si:NH layers and the plurality of low refraction index layers is less than 4.5 um.

4. The infrared band pass filter of claim 1, wherein the hardness of the infrared band pass filter is greater than Mohs hardness 7.

5. The infrared band pass filter of claim 1, wherein the extinction coefficient of the Si:NH layer is less than 0.00012 in the wavelength range between 800 nm and 1100 nm.

6. The infrared band pass filter of claim 1, wherein a transmissivity of the pass band is greater than 90% in the wavelength between 800 nm and 1100 nm.

7. The infrared band pass filter of claim 1, wherein the material of the low refraction index layer is SiNOH; the refraction index of the low refraction index layer is between 1.5 and 2 in a wavelength range between 800 nm and 1100 nm.

8. The infrared band pass filter of claim 7, wherein when an incident angle is changed from 0 degrees to 30 degrees, the center wavelength of the pass band is shifted less than 11.1 nm.

9. The infrared band pass filter of claim 7, wherein the hardness of the infrared band pass filter is greater than Mohs hardness 9.

* * * * *